(No Model.) 2 Sheets—Sheet 1.

P. BATSCHE.
APPARATUS FOR WASHING AND SORTING GRANULAR MATERIALS.

No. 544,607. Patented Aug. 13, 1895.

Witnesses:
William Miller
Chas. E. Poeningen

Inventor:
Peter Batsche
By Hauff & Hauff
His Attorneys (No Model.)  2 Sheets—Sheet 2.
P. BATSCHE.
APPARATUS FOR WASHING AND SORTING GRANULAR MATERIALS.
No. 544,607. Patented Aug. 13, 1895.

Witnesses:

Inventor:
Peter Batsche
By Hauff & Hauff,
His Attorneys

UNITED STATES PATENT OFFICE.

PETER BATSCHE, OF DUSSELDORF, GERMANY.

APPARATUS FOR WASHING AND SORTING GRANULAR MATERIALS.

SPECIFICATION forming part of Letters Patent No. 544,607, dated August 13, 1895.

Application filed May 9, 1895. Serial No. 548,662. (No model.) Patented in Germany July 3, 1894, No. 80,479.

*To all whom it may concern:*

Be it known that I, PETER BATSCHE, a subject of the King of Prussia, residing at Dusseldorf, in the Kingdom of Prussia, German Empire, have invented new and useful Improvements in Apparatus for Washing and Sorting Granular Materials, (for which a patent was obtained in the German Empire July 3, 1894, No. 80,479,) of which the following is a specification.

This invention relates to an arrangement for rapidly and thoroughly cleaning coffee, corn, and the like from intermingled stones, as also adhering dust and the like. The uncleaned material is emptied onto a sieve-like bottom, which is surrounded by a removable hollow cylindrical vessel. This vessel, with the contents, is immersed in a vessel of water and moved up and down several times therein. The water entering through the sieve-bottom carries along with it the light coffee-beans, corn, and the like, so that they float on the water, while the specifically heavier parts—as stones, iron pieces, and the like—drop to the bottom or settle on the sieve. The vessel is now placed on a table, in the top of which the lower part of the receptacle with the sieve is sunk. Then the upper cylindrical receptacle, after detachment from the sieve part, is pushed away with its contents sidewise on the table and toward an opening in the table-top, under which are applied bags for the reception of the cleansed material. The heavier parts remaining on the sieve, with the intermingled coffee-beans and the like, can, after several repetitions of the process with fresh material, be sorted by treating such a strongly-concentrated mass by itself in the same manner like normal material.

Figure 1:
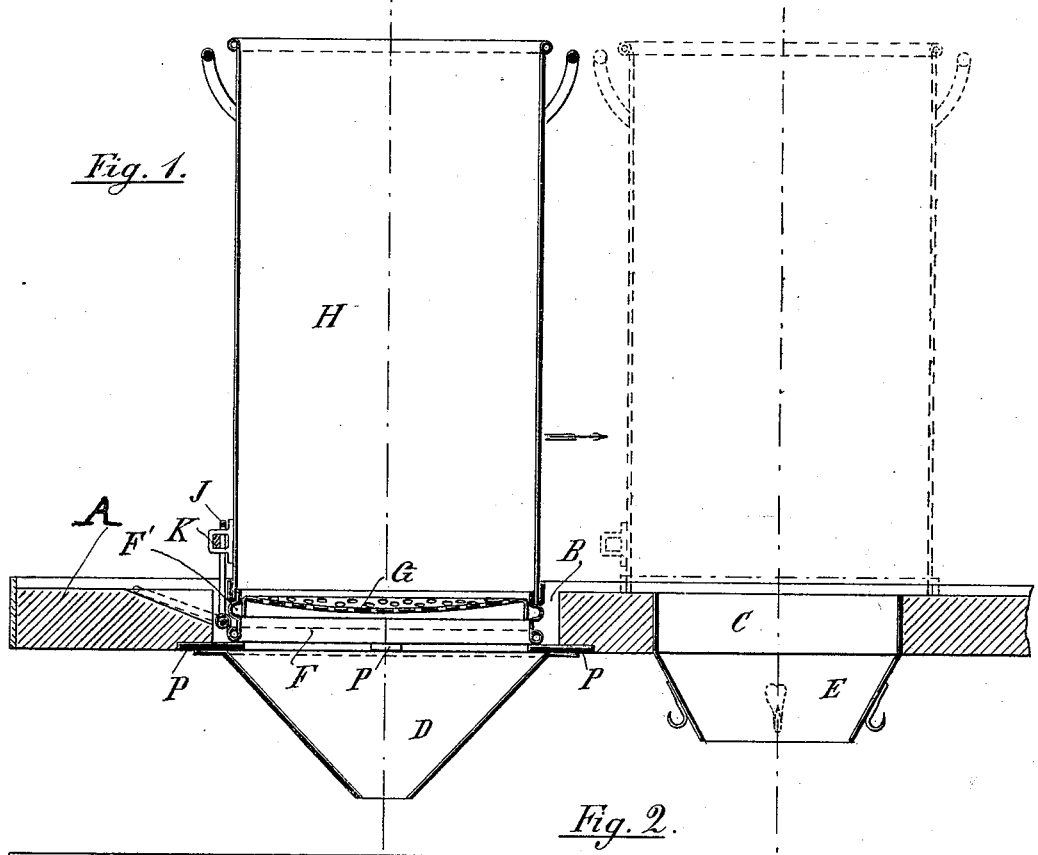
Figure 2:
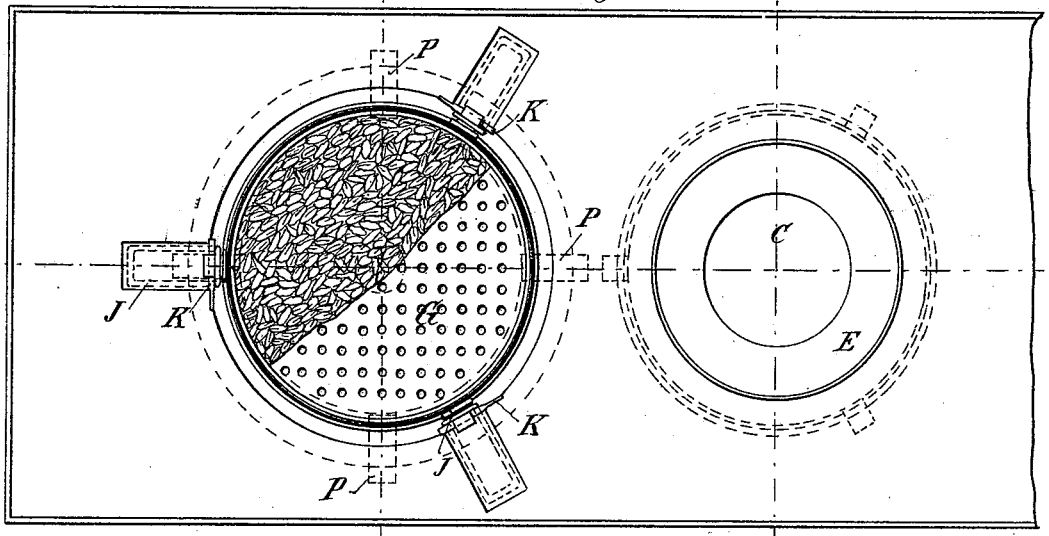
Figure 3:
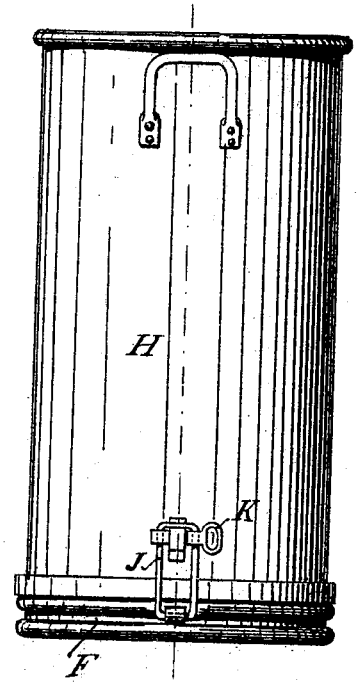
Figure 4:
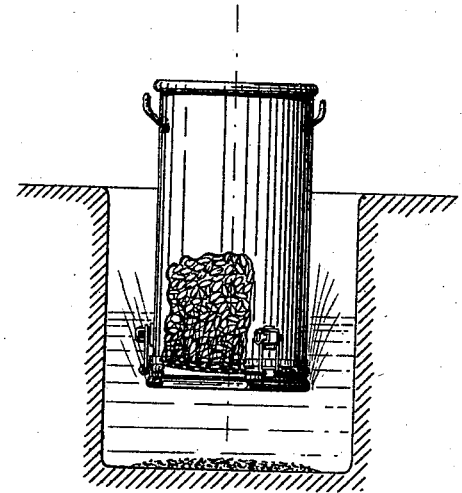

Figure 1 shows the complete apparatus in vertical section. Fig. 2 is a plan view of Fig. 1. Fig. 3 is an elevation of the cleaning-vessel. Fig. 4 shows the manner of working of the same.

The letter A indicates a table-top, with the round openings B C, under both of which open tin funnels D E are arranged. In the first opening B, resting on plates P, is a vessel F, ending flush with the table-top, and which is provided with a bent sieve-like bottom G, inserted below the rim. Upon this vessel F is placed the hollow cylindrical receptacle H, open at both ends, so that the latter rests on a bead F' and is firmly connected with the vessel by any suitable appliance, as a bayonet-joint, or by a bail J and wedge or key K. The receptacle thus formed and closed below is filled to about three-fourths of its height with the material to be cleansed, then lifted from the table and dipped into a vessel with water, Fig. 4, in which it is moved several times up and down. The water, entering forcibly through the sieve-bottom G, carries along the material in an upward direction, and again downward, and cleanses the beans, corn, and the like from adhering dust. Smaller stones and the like fall through the meshes of the sieve. Larger ones, on the other hand, collect on the sieve-bottom during the dipping of the vessel in consequence of their specifically heavier weight. The receptacle is then put back to its former place, Fig. 1, and the fastenings are freed, so that the upper and lower parts can be pushed apart. The upper part is brought into the position indicated in Fig. 1 by dotted lines, over the opening C, beneath which is a bag for receiving the material falling through C. By means of this arrangement the simultaneous cleansing of the material from dust (washing) and the separation of all hard and specifically heavy parts from the same are effected by simple means. An attendant will suffice for the service.

What I claim as new, and desire to secure by Letters Patent, is—

An apparatus for washing and sorting granular materials according to specific weight, comprising a sieve with sunken bottom G and removable rim H, and a table having several openings, and a rim P at one of said openings for supporting the sieve, said last named opening being of such depth that the upper edge of the sieve bottom G lies in the plane of the table top substantially as and for the purpose set forth.

In testimony whereof I have hereunto set my hand in the presence of two subscribing witnesses.

PETER BATSCHE.

Witnesses:
 WM. ESSENWEIN,
 ERNETINE ANDRÉ.